(12) United States Patent
Chun et al.

(10) Patent No.: US 11,288,501 B2
(45) Date of Patent: *Mar. 29, 2022

(54) TACTILE PERCEPTION SYSTEM AND METHOD OF BUILDING A DATABASE THEREOF

(71) Applicant: IUCF-HYU (INDUSTRY-UNIVERSITY COOPERATION FOUNDATION HANYANG UNIVERSITY), Seoul (KR)

(72) Inventors: Sungwoo Chun, Gyeonggi-do (KR); Wanjun Park, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 527 days.

This patent is subject to a terminal disclaimer.

(21) Appl. No.: 15/835,970

(22) Filed: Dec. 8, 2017

(65) Prior Publication Data

US 2018/0121722 A1 May 3, 2018

Related U.S. Application Data

(63) Continuation of application No. PCT/KR2016/006103, filed on Jun. 9, 2016.

(30) Foreign Application Priority Data

Jun. 9, 2015 (KR) .......................... 10-2015-0081286
Jun. 8, 2016 (KR) .......................... 10-2016-0071292

(51) Int. Cl.
*G06K 9/00* (2006.01)
*G06F 3/045* (2006.01)
*G06F 16/28* (2019.01)

(52) U.S. Cl.
CPC ......... *G06K 9/00543* (2013.01); *G06F 3/045* (2013.01); *G06K 9/0051* (2013.01);
(Continued)

(58) Field of Classification Search
CPC ............. G06K 9/00543; G06K 9/0051; G06K 9/0053; G06K 2209/40; G06F 3/045; G06F 16/285
See application file for complete search history.

(56) References Cited

U.S. PATENT DOCUMENTS 7,925,079 B1 * 4/2011 Mills .................... G06K 9/6217
382/159
9,297,831 B2 * 3/2016 Ahn ....................... G06F 3/045
(Continued)

FOREIGN PATENT DOCUMENTS

JP 2010-044028 A 2/2010
KR 101081369 B1 * 11/2011 ............. A61B 5/048
(Continued)

OTHER PUBLICATIONS

Chaehyun Lim, "Research and Development of Highly Sensitive Biomimetic Tactile Sensor for Analyzing Surface Texture", Division of Nanoscale Semiconductor Engineering Hanyang University, pp. 1-161.
(Continued)

*Primary Examiner* — Douglas Kay
(74) *Attorney, Agent, or Firm* — Sughrue Mion, PLLC

(57) ABSTRACT

A tactile perception system is provided. The tactile perception system includes a storage unit storing tactile data and feature information corresponding to the tactile data, a
(Continued)

sensing unit sensing surface characteristics of an object to generate a sensing signal, an extraction unit extracting sensing information from the sensing signal generated by the sensing unit, and a matching unit extracting a piece of feature information, which is matched with the sensing information, from the feature information stored in the storage unit and extracting a piece of tactile data, which corresponds to the piece of feature information, from the tactile data stored in the storage unit.

13 Claims, 10 Drawing Sheets

(52) U.S. Cl.
CPC .......... *G06K 9/0053* (2013.01); *G06F 16/285* (2019.01); *G06K 2209/40* (2013.01)

(56) References Cited

U.S. PATENT DOCUMENTS

| | | | | |
|---|---|---|---|---|
| 10,289,230 | B2* | 5/2019 | Park | B32B 18/00 |
| 2007/0250294 | A1* | 10/2007 | Omata | G01N 3/405 |
| | | | | 702/189 |
| 2010/0332475 | A1* | 12/2010 | Birdwell | G06K 9/6224 |
| | | | | 707/737 |
| 2013/0156063 | A1* | 6/2013 | Kim | G01N 25/18 |
| | | | | 374/44 |
| 2015/0066377 | A1* | 3/2015 | Parchen | G06K 9/00536 |
| | | | | 702/19 |
| 2015/0109006 | A1 | 4/2015 | Choi et al. | |
| 2015/0301651 | A1* | 10/2015 | Leigh | G02F 1/13338 |
| | | | | 345/174 |
| 2016/0025615 | A1* | 1/2016 | Fishel | G01N 19/00 |
| | | | | 702/33 |
| 2017/0090639 | A1* | 3/2017 | Park | G06F 3/041 |

FOREIGN PATENT DOCUMENTS

| | | | |
|---|---|---|---|
| KR | 20120095076 A * | 8/2012 | |
| KR | 10-2013-0091493 A | 8/2013 | |
| WO | 2011/093557 A1 | 8/2011 | |
| WO | 2012/015077 A1 | 2/2012 | |
| WO | 2013/191491 A1 | 12/2013 | |

OTHER PUBLICATIONS

International Search Report for PCT/KR2016/006103 dated Sep. 1, 2016 [PCT/ISA/210].

Written Opinion for PCT/KR2016/006103 dated Sep. 1, 2016 [PCT/ISA/237].

* cited by examiner

[Fig. 1]
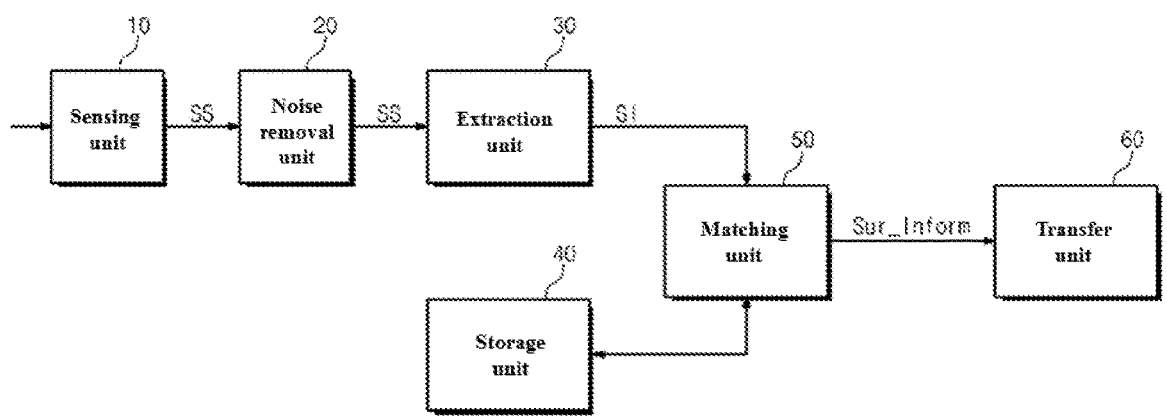

[Fig. 2]
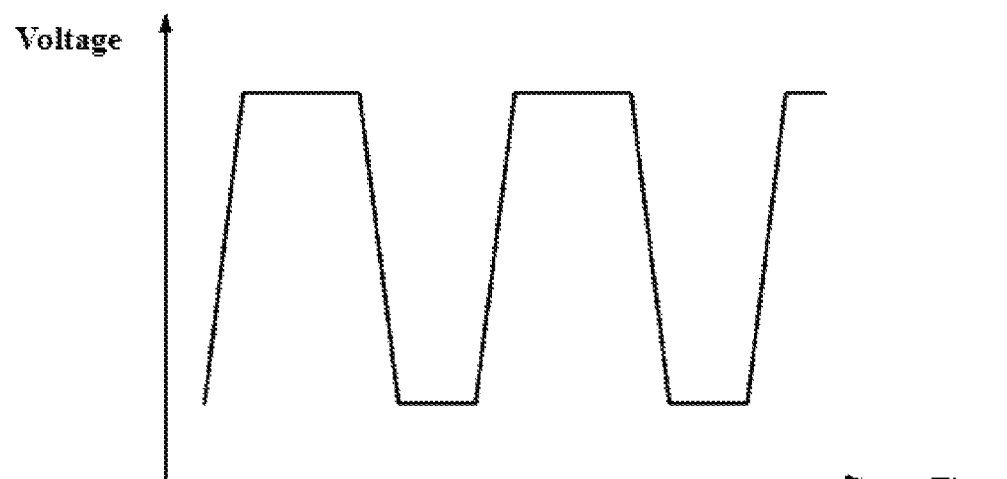
(a)
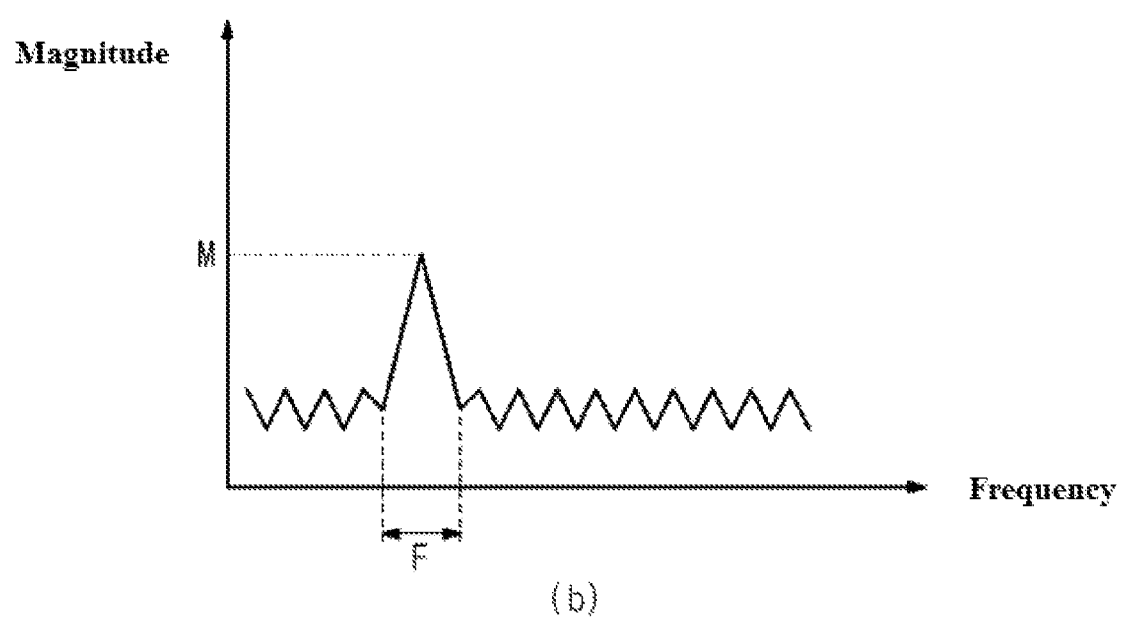
(b)

[Fig. 3]
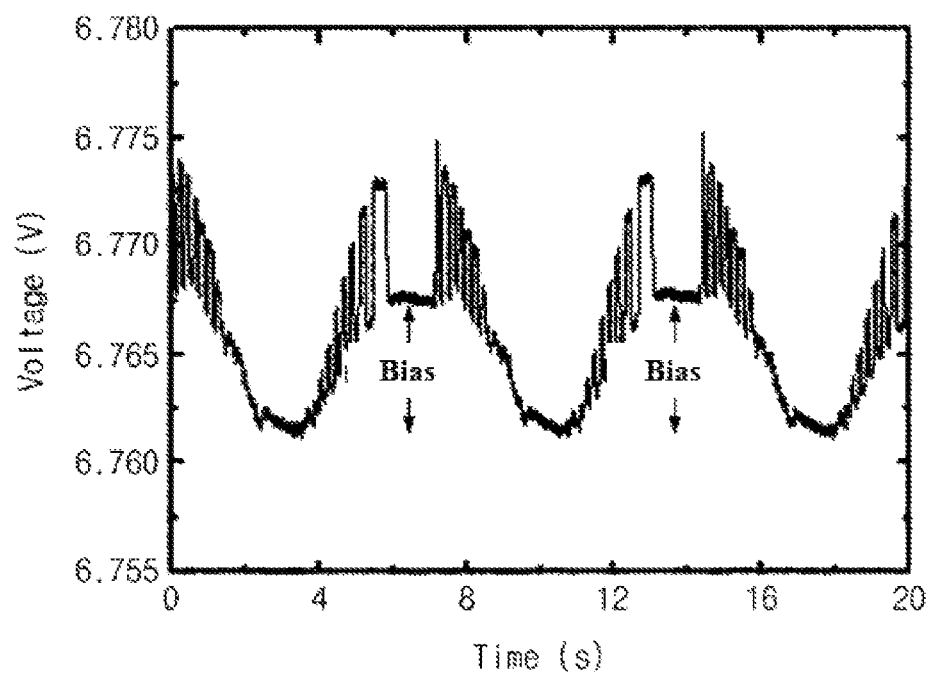
[Fig. 4]
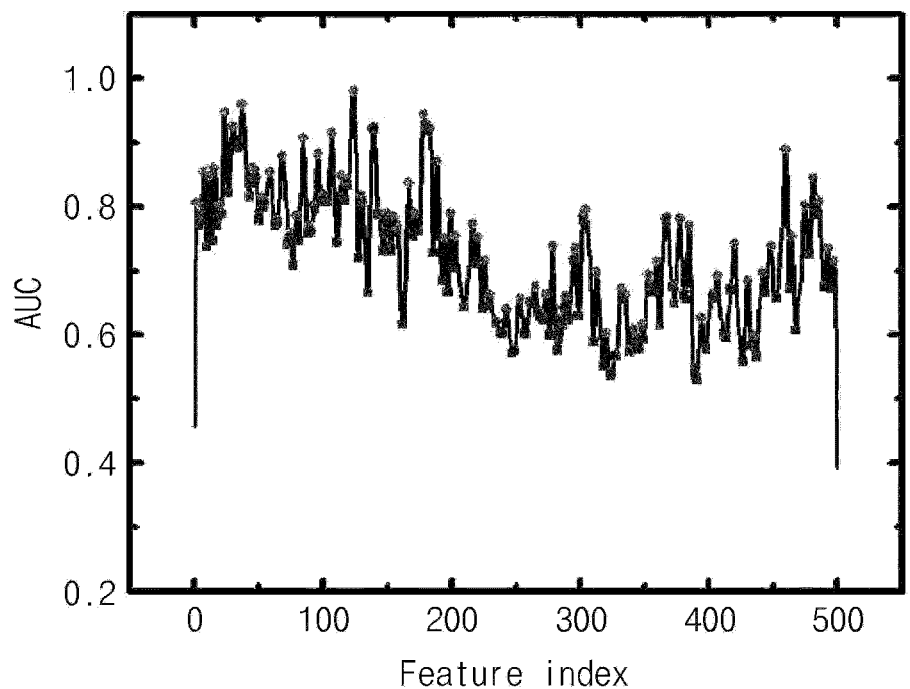

[Fig. 5]
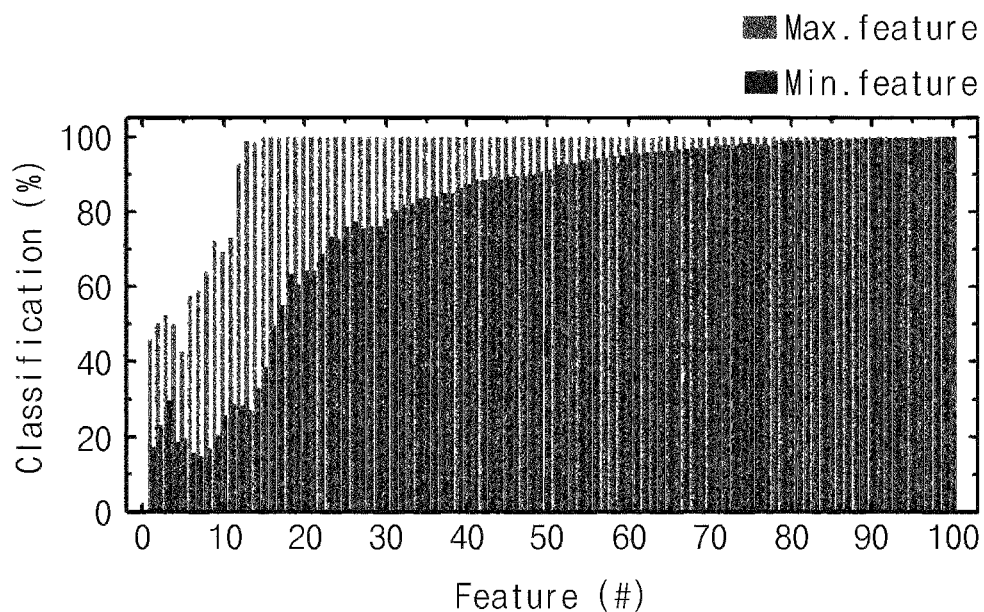
[Fig. 6]
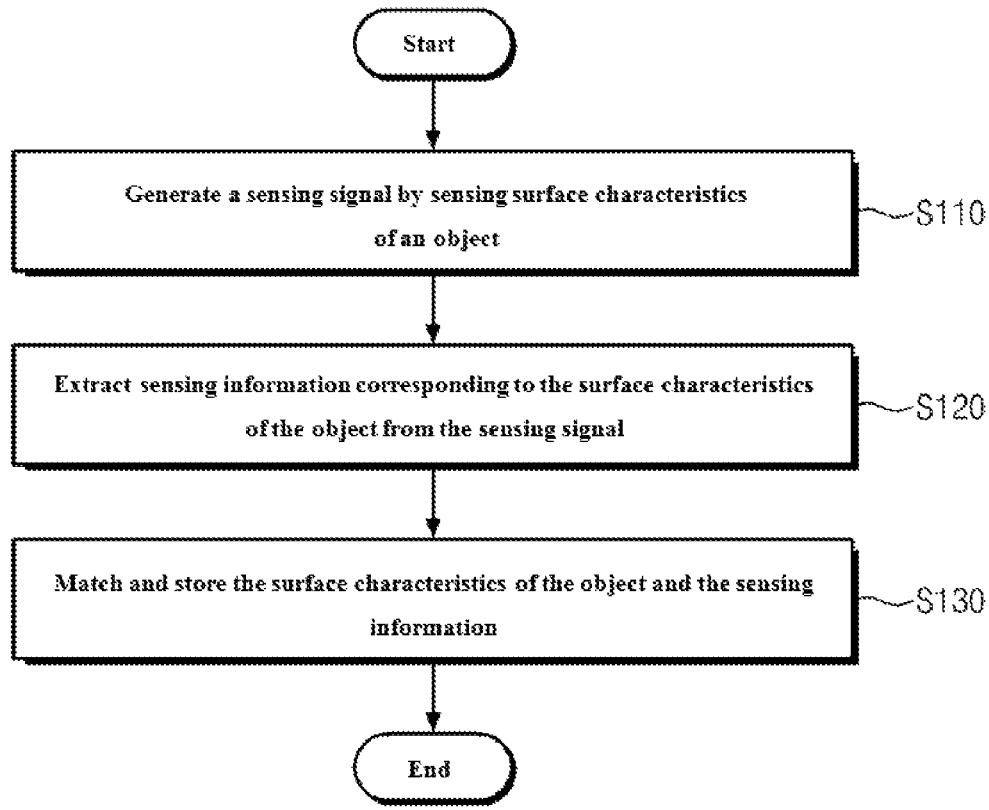

[Fig. 7]
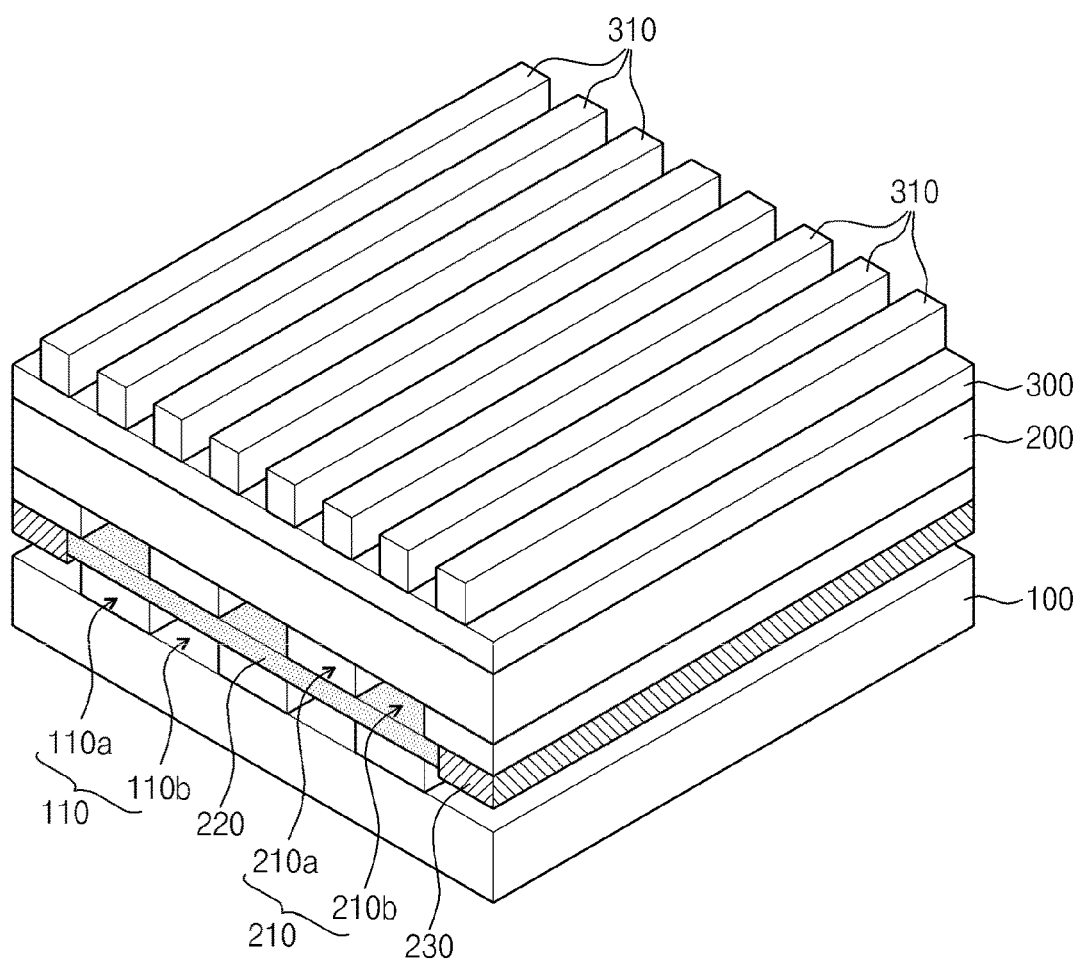

[Fig. 8]
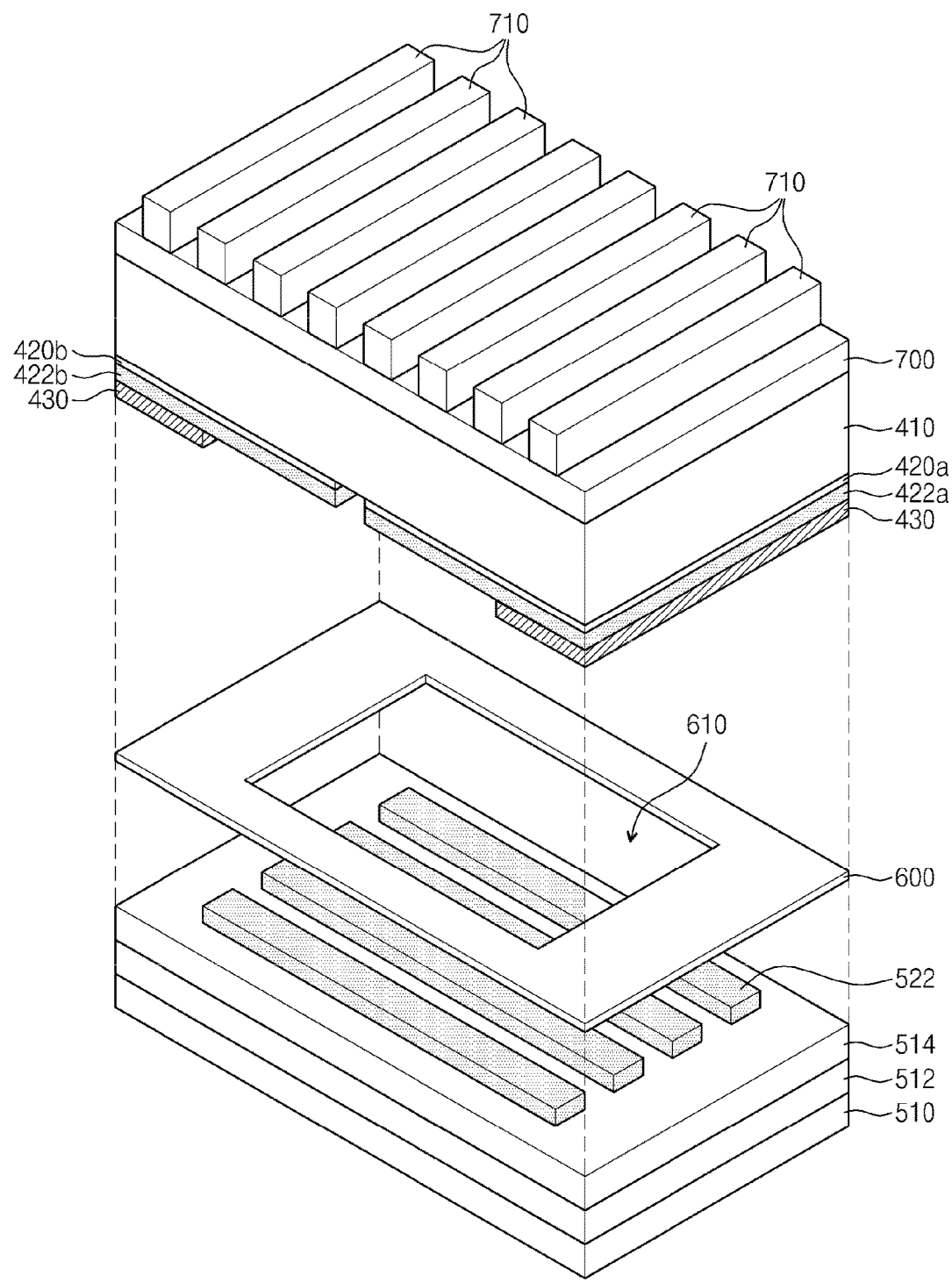

[Fig. 9]
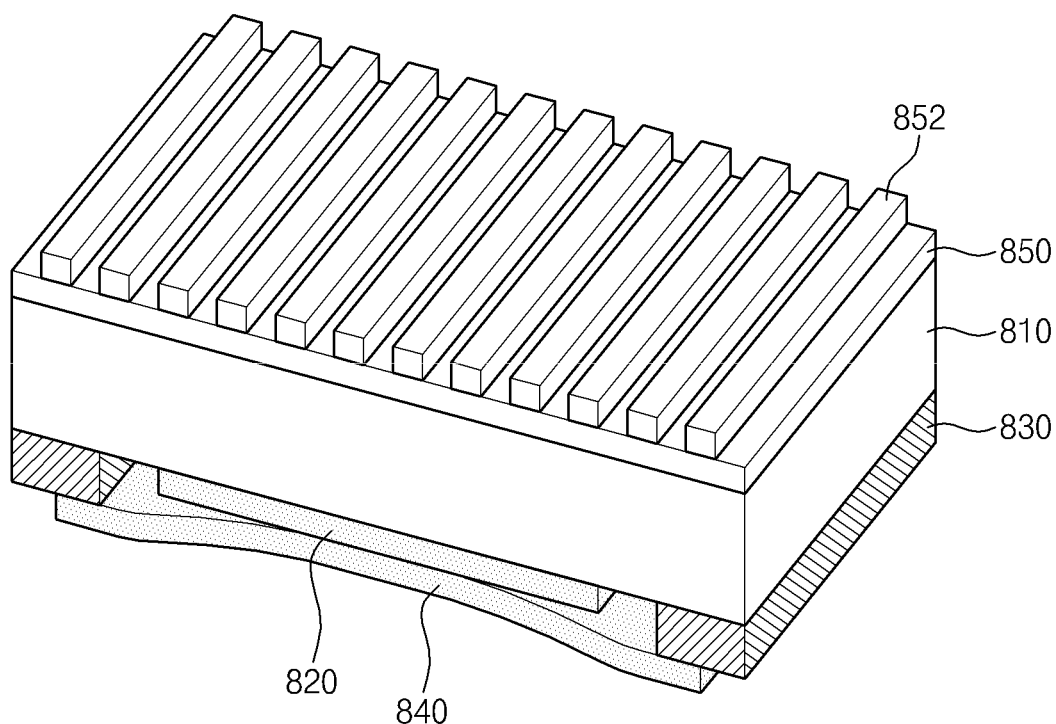

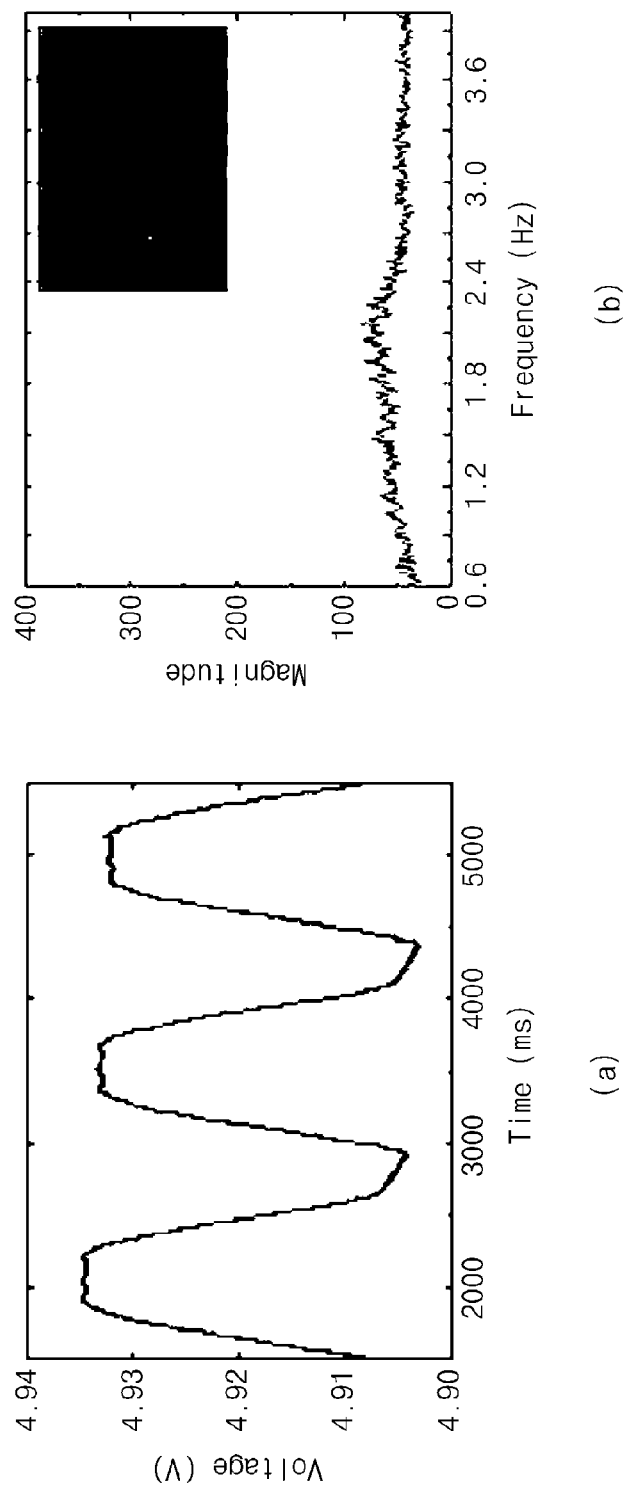
[Fig. 10]

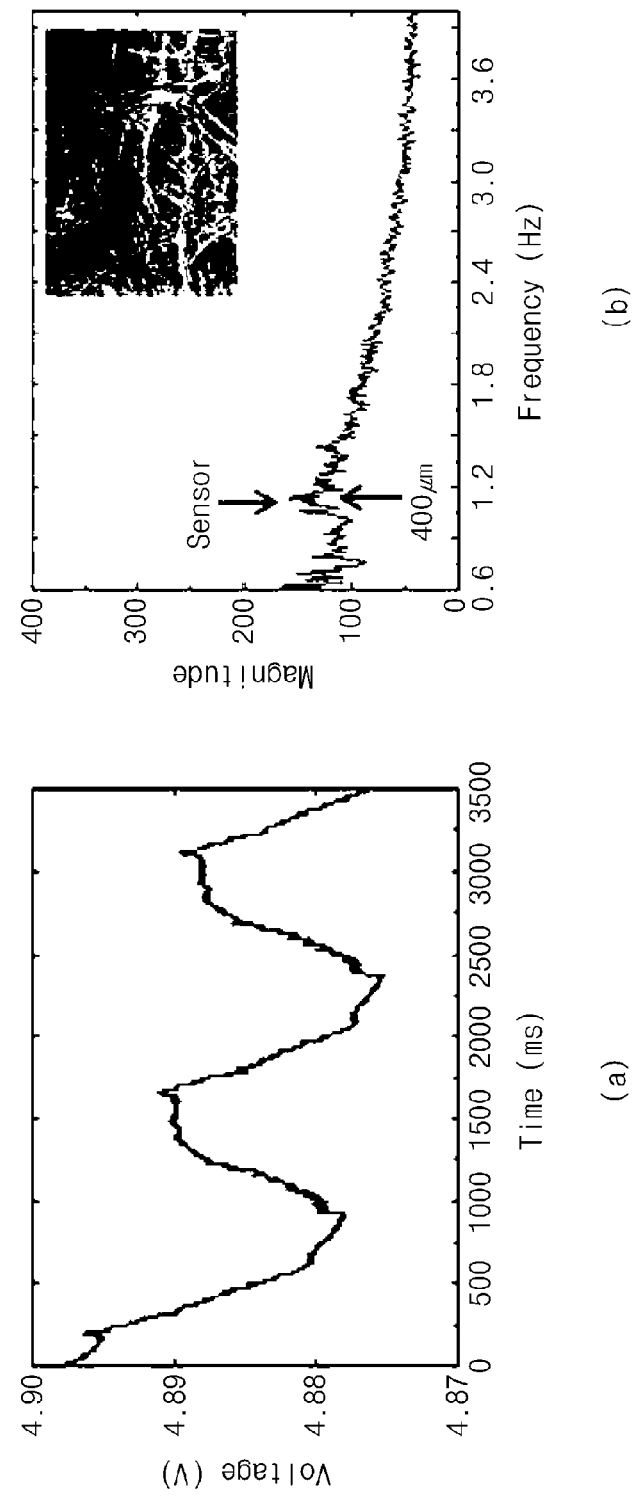
[Fig. 11]

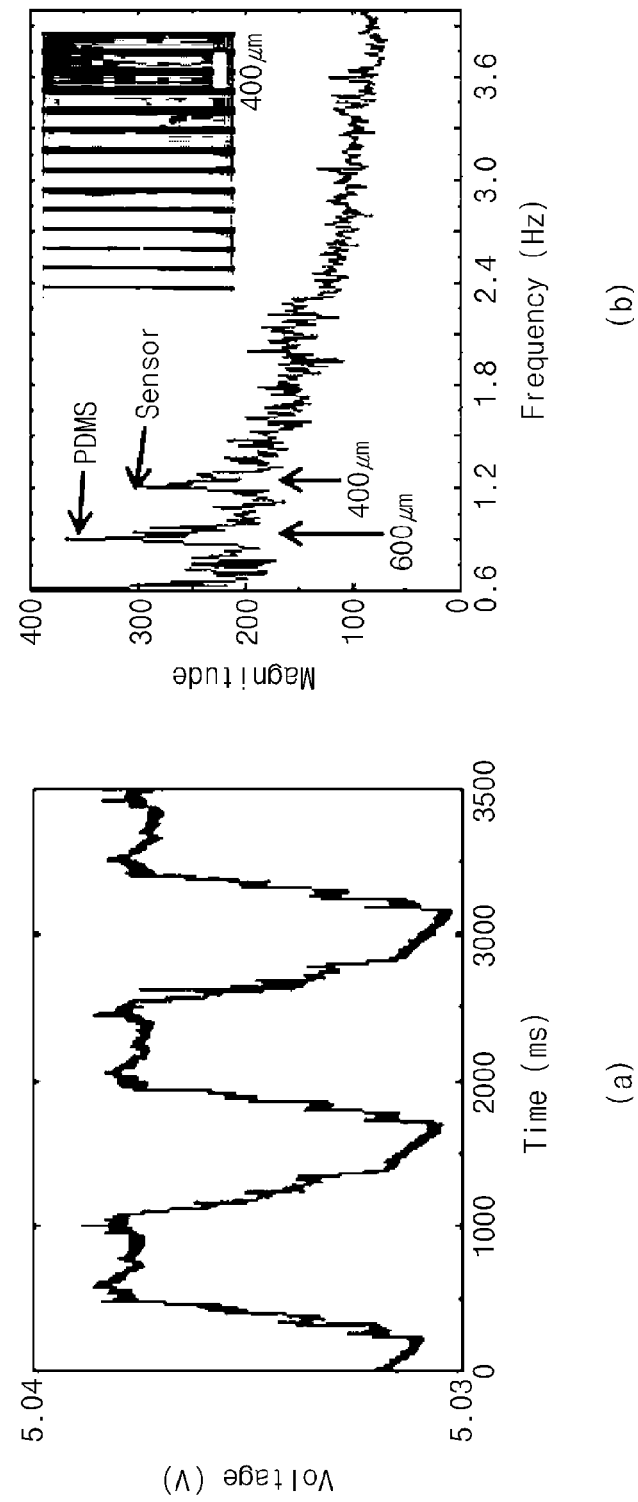
[Fig. 12]

TACTILE PERCEPTION SYSTEM AND METHOD OF BUILDING A DATABASE THEREOF

CROSS-REFERENCE TO RELATED APPLICATION

This application is a continuation of pending International Application No. PCT/KR2016/006103, which was filed on Jun. 9, 2016 and claims priority to Korean Patent Application Nos. 10-2015-0081286 and 10-2016-0071292, respectively filed on Jun. 9, 2015 and Jun. 8, 2016, in the Korean Intellectual Property Office, the disclosures of which are hereby incorporated by reference in their entireties.

BACKGROUND

1. Field

Embodiments of the inventive concepts relate to a tactile perception system and a method of building a database thereof and, more particularly, to a tactile perception system that senses surface characteristics of an object to extract tactile information of the object, and a method of building a database thereof.

2. Description of the Related Art

The development of devices based on a touch becomes an important issue due to the rapid development of mobile devices and efforts to imitate a human touch. A touch sensor and a wearable electronic device ever invented have been developed to sense a touch.

A material used in the touch sensor includes indium tin oxide (ITO) disposed on a silicon or glass substrate. The touch sensor using the ITO material is not flexible, and thus there is a limit to apply the touch sensor using the ITO material to a wearable device and a curved display device.

Thus, touch sensors using new materials (e.g., a nanowire, a carbon nanotube, and graphene) are being developed. For example, Korean Patent Publication No. 10-2013-0091493 (Application No. 10-2012-0012817) discloses a graphene touch panel that has an excellent warpage characteristic, a low manufacture cost and a large area by using an organic insulator and a graphene pattern layer patterned using a polymer stamp and an organic solvent, and a method of manufacturing the same.

Meanwhile, various tactile sensors having an artificial fingerprint structure capable of sensing surface characteristics (e.g., a texture) of a touched object have been developed to sense not only presence of a touch but also various tactile sensations such as hardness, roughness, touch pressure, elasticity, temperature and/or a shape of an object.

Tactile information digitized using the tactile sensors may realize biomimetic tactile sensations similar to tactile sensations directly felt by humans and may thus be applied to various technical fields such as an artificial skin, an artificial arm, a surgical robot, a touch sensor, a virtual reality system, and a tactile display device.

SUMMARY

Embodiments of the inventive concepts may provide a highly reliable tactile perception system and a method of building a database thereof.

Embodiments of the inventive concepts may also provide a learning tactile perception system and a method of building a database thereof.

Embodiments of the inventive concepts may further provide a tactile perception system capable of sensing surface characteristics (e.g., a texture) of an object and a method of building a database thereof.

In an aspect, a tactile perception system may include a storage unit storing tactile data and feature information corresponding to the tactile data, a sensing unit sensing surface characteristics of an object to generate a sensing signal, an extraction unit extracting sensing information from the sensing signal generated by the sensing unit, and a matching unit extracting a piece of feature information, which is matched with the sensing information, from the feature information stored in the storage unit and extracting a piece of tactile data, which corresponds to the piece of feature information, from the tactile data stored in the storage unit.

In some embodiments, the tactile data may include information on hardness, elasticity, a shape and/or a roughness of the object.

In some embodiments, the sensing unit may include a graphene pattern, and the sensing unit may sense the surface characteristics of the object by using a change in resistance caused by physical deformation of the graphene pattern.

In some embodiments, the tactile perception system may further include a noise removal unit removing noise of the sensing signal.

In some embodiments, the tactile perception system may further include a transfer unit transferring the piece of tactile data to a user.

In some embodiments, the extraction unit may frequency-convert the sensing signal and may extract the sensing information from the frequency-converted sensing signal.

In some embodiments, the sensing information may include a peak value in a specific frequency band of the frequency-converted sensing signal.

In an aspect, a method of building a database of a tactile perception system may include generating a sensing signal by sensing surface characteristics of an object, extracting sensing information corresponding to the surface characteristics of the object from the sensing signal, and matching and storing the surface characteristics of the object and the sensing information.

In some embodiments, the extracting of the sensing information may include frequency-converting the sensing signal, and defining a peak value in a specific frequency band of the frequency-converted sensing signal as the sensing information.

In some embodiments, the sensing information may have a value changed according to a surface roughness of the object.

In some embodiments, the generating of the sensing signal may include touching a plurality of sensing patterns having line shapes to a surface of the object.

In an aspect, a tactile perception system may include a sensing unit sensing surface characteristics of a target object and a comparative object to generate a target sensing signal and a comparative sensing signal, respectively, an extraction unit extracting target sensing information from the target sensing signal and the comparative sensing signal generated by the sensing unit, and a storage unit matching the target sensing information with tactile data of the target object and storing the target sensing information and the tactile data of the target object. The extraction unit may frequency-convert the target sensing signal and the comparative sensing signal, and the extraction unit may compare the frequency-converted target sensing signal with the frequency-converted comparative sensing signal to define at least some of frequency values and corresponding peak values, at which differences between peak values exist, as the target sensing information.

In some embodiments, the extraction unit may calculate differences between peak values of the frequency-converted target sensing signal and peak values of the frequency-converted comparative sensing signal. The extraction unit may define frequency values and corresponding peak values of the frequency-converted target sensing signal, at which the differences are relatively great, as the target sensing information.

In some embodiments, the extraction unit may align frequency values and corresponding peak values of the frequency-converted target sensing signal in order of magnitude of the differences. The extraction unit may define a plurality of frequency values and corresponding peak values of the frequency-converted target sensing signal, at which the differences are relatively great, as the target sensing information.

In some embodiments, the tactile perception system may further include a noise removal unit removing noise and a bias from the target sensing signal. The extraction unit may frequency-convert the target sensing signal, from which the noise and the bias are removed, and may extract the target sensing information by using the frequency-converted target sensing signal.

BRIEF DESCRIPTION OF THE DRAWINGS

FIG. 1 is a block diagram illustrating a tactile perception system according to some embodiments of the inventive concepts.

FIG. 2 is a graph for explaining a sensing signal and sensing information of a tactile perception system according to some embodiments of the inventive concepts.

FIG. 3 is a graph for explaining a noise removal unit included in a tactile perception system according to some embodiments of the inventive concepts.

FIGS. 4 and 5 are graphs for explaining an extraction unit included in a tactile perception system according to some embodiments of the inventive concepts.

FIG. 6 is a flowchart illustrating a method of building a database of a tactile perception system according to some embodiments of the inventive concepts.

FIG. 7 is a perspective view illustrating a first embodiment of a touch sensor of a sensing unit included in a tactile perception system according to some embodiments of the inventive concepts.

FIG. 8 is a perspective view illustrating a second embodiment of a touch sensor of a sensing unit included in a tactile perception system according to some embodiments of the inventive concepts.

FIG. 9 is a perspective view illustrating a third embodiment of a touch sensor of a sensing unit included in a tactile perception system according to some embodiments of the inventive concepts.

FIG. 10 is a graph for explaining a sensing signal of polyethylene terephthalate (PET) measured using a tactile perception system according to some embodiments of the inventive concepts.

FIG. 11 is a graph for explaining a sensing signal of fabric measured using a tactile perception system according to some embodiments of the inventive concepts.

FIG. 12 is a graph for explaining a sensing signal of patterned polydimethylsiloxane (PDMS) measured using a tactile perception system according to some embodiments of the inventive concepts.

DETAILED DESCRIPTION OF THE EMBODIMENTS

The inventive concepts will now be described more fully hereinafter with reference to the accompanying drawings, in which exemplary embodiments of the inventive concepts are shown. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts.

It will be understood that when an element such as a layer, region or substrate is referred to as being "on" another element, it can be directly on the other element or intervening elements may be present. In addition, in the drawings, the thicknesses of layers and regions are exaggerated for clarity.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concepts explained and illustrated herein include their complementary counterparts. As used herein, the term "and/or" includes any and all combinations of one or more of the associated listed items.

The terminology used herein is for the purpose of describing particular embodiments only and is not intended to limit the invention. As used herein, the singular terms "a", "an" and "the" are intended to include the plural forms as well, unless the context clearly indicates otherwise. It will be further understood that the terms "comprises", "comprising", "includes", "including", "have", "has" and/or "having" when used herein, specify the presence of stated features, integers, steps, operations, elements, and/or components, but do not preclude the presence or addition of one or more other features, integers, steps, operations, elements, components, and/or groups thereof. Furthermore, it will be understood that when an element is referred to as being "connected" or "coupled" to another element, it may be directly connected or coupled to the other element or intervening elements may be present.

In addition, in explanation of the present invention, the descriptions to the elements and functions of related arts may be omitted if they obscure the subjects of the inventive concepts.

Furthermore, "a touch sensor" used in the present specification may sense whether or not an object touches the sensor, a touch strength of an object, and a touch speed of an object and may also sense surface characteristics (e.g., a texture) of an touched object.

FIG. 1 is a block diagram illustrating a tactile perception system according to some embodiments of the inventive concepts, and FIG. 2 is a graph for explaining a sensing signal and sensing information of a tactile perception system according to some embodiments of the inventive concepts. FIG. 3 is a graph for explaining a noise removal unit included in a tactile perception system according to some embodiments of the inventive concepts, and FIGS. 4 and 5 are graphs for explaining an extraction unit included in a tactile perception system according to some embodiments of the inventive concepts.

Referring to FIG. 1, a tactile perception system according to some embodiments of the inventive concepts may include a sensing unit 10, a noise removal unit 20, an extraction unit 30, a storage unit 40, a matching unit 50, and a transfer unit 60.

The sensing unit 10 may include a touch sensor. When an object touches the touch sensor, the sensing unit 10 may sense surface characteristics of the object and may generate a sensing signal SS. In some embodiments, the touch sensor of the sensing unit 10 may include a graphene pattern and may sense a touch of the object by using a resistance change according to physical deformation of the graphene pattern caused by the touch of the object. Alternatively, in other embodiments, the touch sensor of the sensing unit 10 may not use the graphene pattern.

In some embodiments, the sensing signal SS generated from the sensing unit 10 may have a value of a function with respect to time. For example, the sensing signal SS may be a signal in which a difference in voltage between both ends of the graphene pattern is periodically changed by the physical deformation of the graphene pattern caused according to the surface characteristics of the object, as shown in a graph (a) of FIG. 2. A period and an intensity of the sensing signal SS may be changed depending on the surface characteristics (e.g., a surface roughness) of the object.

The voltage difference is periodically changed according to time in the graph (a) of FIG. 2. However, embodiments of the inventive concepts are not limited thereto. In another embodiment, a current flowing through the both ends of the graphene pattern may be periodically changed according to time.

The noise removal unit 20 may remove noise of the sensing signal SS. For example, the noise removal unit 20 may remove a bias of the sensing signal SS. In more detail, the sensing signal SS may include a bias signal, as shown in FIG. 3. The bias signal may be generated when the object presses the sensing unit 10, and thus the bias signal may be irrelevant to the surface characteristics of the object. As a result, the bias signal may be removed from the sensing signal SS in some embodiment of the inventive concepts.

The extraction unit 30 may receive the sensing signal SS which is generated from the sensing unit 10 and of which the noise is removed by the noise removal unit 20. The extraction unit 30 may extract sensing information SI from the sensing signal SS. The extraction unit 30 may extract the sensing information SI from the sensing signal SS by a mel-scale filter bank method, a linear predictive cepstral coefficients method, a running energy method, a zero crossing rate method, a pitch method, a residual energy method, or a running partial residual energy method.

In some embodiments, the extraction unit 30 may frequency-convert the sensing signal SS as shown in a graph (b) of FIG. 2 and may extract the sensing information SI from the frequency-converted sensing signal. The sensing information SI may be a peak value M in a specific frequency band F of the frequency-converted sensing signal. The sensing signal SS may be changed according to the surface characteristics (e.g., the surface roughness) of the object as described above, and thus the sensing information SI may also be changed according to the surface characteristics (e.g., the surface roughness) of the object. As a result, the sensing information SI may have a specific value corresponding to the surface characteristics of the object.

In other words, the extraction unit 30 may extract the sensing information SI having a specific value corresponding to surface characteristics of each of a plurality of objects, and the sensing information SI of the plurality of objects may be stored in the storage unit 40. In more detail, in the event that the sensing unit 10 senses surface characteristics of a target object and a comparative object to generate a target sensing signal and a comparative sensing signal, the extraction unit 30 may extract target sensing information from the target sensing signal and the comparative sensing signal generated from the sensing unit 10. The target sensing information may be matched with tactile data of the target object, and the target sensing information and the tactile data may be stored in the storage unit 40.

The process of extracting the target sensing information by the extraction unit 30 may include frequency-converting the target sensing signal and the comparative sensing signal, calculating differences between peak values of the frequency-converted target sensing signal and peak values of the frequency-converted comparative sensing signal, aligning frequency values and corresponding peak values of the frequency-converted target sensing signal in order of magnitude of the differences, and defining frequency values and corresponding peak values of the frequency-converted target sensing signal, at which the differences are relatively great, as the target sensing information. In some embodiments, the differences between the peak values of the frequency-converted target sensing signal and the peak values of the frequency-converted comparative sensing signal may be calculated using the frequency-converted target sensing signal and the frequency-converted comparative sensing signal by an area under the curve (AUC) method, and the frequency values corresponding to the differences may be indexed and illustrated as shown in FIG. 4 (a circle represents the maximum value and a square represents the minimum value in FIG. 4). As shown in FIG. 5, the target object can be classified using simply thirteen frequency values and thirteen peak values at which the differences in peak value between the frequency-converted target sensing signal and the frequency-converted comparative sensing signal are relatively great.

The storage unit 40 may store tactile data and feature information corresponding to each other. For example, the storage unit 40 may store a table in which the tactile data and the feature information are matched with each other in one-to-one correspondence. The tactile data may be information obtained by digitizing the surface characteristics of the object. For example, the tactile data may be information on a surface roughness, a surface hardness, and/or elasticity. The feature information may include the peak value M in the specific frequency band F, as shown in the graph (b) of FIG. 2.

The matching unit 50 may receive the sensing information SI from the extraction unit 30. The matching unit 50 may extract a piece of feature information, which is matched with the sensing information SI, from the feature information stored in the storage unit 40 and may also extract a piece of tactile data Sur_inform, which corresponds to the piece of feature information, from the tactile data. The matching unit 50 may transfer the piece of tactile data Sur_inform to the transfer unit 60.

When the piece of feature information matched with the sensing information SI does not exist in the feature information stored in the storage unit 40, the matching unit 50 may learn and classify the sensing information SI by a learning method such as a support vector machine (SVM) method, a gaussian mixture mode (GMM) method, or a neural network method.

Alternatively, when the piece of feature information matched with the sensing information SI does not exist in the feature information stored in the storage unit 40, the matching unit 50 may store the storage unit 40 with the sensing information SI and may request tactile data corresponding to the sensing information SI from a user. When a user inputs the tactile data corresponding to the sensing information SI, the storage unit 40 may convert the sensing information SI into feature information. In addition, the storage unit 40 may match the feature information converted from the sensing information SI with the tactile data and may store the feature information and the tactile data matched with each other.

The transfer unit 60 may transfer the piece of tactile data Sur_inform corresponding to the piece of feature information to a user. For example, the transfer unit 60 may display the piece of tactile data Sur_inform on a screen or may transfer an electrical signal corresponding to the piece of tactile data Sur_inform to a user. In other words, the transfer unit 60 may quantify the information digitized as the piece of tactile data Sur_inform, may convert the quantified information into tactile sensation, and may transfer the tactile sensation to a user.

According to the embodiments of the inventive concepts, the tactile perception system may sense surface characteristics of an object and may extract tactile data corresponding to the surface characteristics of the object. In addition, the tactile perception system may transfer the extracted tactile data to a user. Thus, a highly reliable tactile perception system capable of sensing a texture of the object may be provided.

In addition, the tactile perception system according to the embodiments of the inventive concepts may be applied to various technical fields such as an artificial skin, an artificial arm, a surgical robot, a touch sensor, a virtual reality system, and a tactile display device.

Furthermore, in the embodiment described with reference to FIG. 1, each of the blocks may represent a module, segment or a portion of a code which includes one or more executable instructions for executing the specified logical function(s). In addition, in other embodiments, the mentioned functions of the blocks may be performed out of sequence. For example, the functions of two blocks sequentially illustrated may be substantially performed at the same time, and/or the functions of the blocks may sometimes be performed in reverse order.

A method of building a database of the tactile perception system will be described hereinafter.

FIG. 6 is a flowchart illustrating a method of building a database of a tactile perception system according to some embodiments of the inventive concepts.

Referring to FIG. 6, a sensing signal may be generated by sensing surface characteristics of an object (S110). The surface characteristics of the object may be sensed using the sensing unit 10 described with reference to FIG. 1. In addition, the sensing signal may have the value of the function with respect to time, as described with reference to the graph (a) of FIG. 2.

Sensing information corresponding to the surface characteristics of the object may be extracted from the sensing signal (S120). The extraction of the sensing information may include frequency-converting the sensing signal and defining a peak value in a specific frequency band of the frequency-converted sensing signal as the sensing information, as described with reference to the graph (b) of FIG. 2.

As described with reference to FIGS. 1 to 5, the sensing signal may be changed depending on the surface characteristics (e.g., a surface roughness) of the object, and thus the sensing information changed depending on the surface characteristics (e.g., the surface roughness) of the object may be extracted. The sensing information may be extracted by the extraction unit 30 described with reference to FIG. 1.

The surface characteristics of the object and the sensing information may be matched with each other and may be stored (S130). The surface characteristics of the object may be tactile data obtained by digitizing the surface characteristics and may be information on a surface roughness, a surface hardness and/or elasticity, as described with reference to FIGS. 1 and 2. The surface characteristics of the object and the sensing information may be matched with each other in one-to-one correspondence so as to be stored in the storage unit 40 described with reference to FIG. 1.

According to the embodiments of the inventive concepts, the surface characteristics of the object may be sensed to generate the sensing signal, and the sensing information extracted from the sensing signal may be stored to correspond to the surface characteristics of the object. Thus, a database may be built. As a result, it is possible to realize or provide the method of building the database, which is easily applied to the tactile perception system.

As described above, the touch sensor of the sensing unit included in the tactile perception system according to the present embodiment may include the graphene pattern. In addition, the touch sensor may touch a plurality of sensing patterns having line shapes to a surface of an object to generate the sensing signal. Various embodiments of the touch sensor of the sensing unit included in the tactile perception system according to the inventive concepts will be described hereinafter.

FIG. 7 is a perspective view illustrating a first embodiment of a touch sensor of a sensing unit included in a tactile perception system according to some embodiments of the inventive concepts.

Referring to FIG. 7, a touch sensor according to a first embodiment may include a first substrate 100, a first pattern 110 disposed on the first substrate 100 and having a first protruding region 110a and a first concave region 110b, a second substrate 200 on the first substrate 100, a second pattern 210 disposed on the second substrate 200 to face the first pattern 110 and having a second protruding region 210a and a second concave region 210b, a graphene pattern 220 between the first pattern 110 and the second pattern 210, electrode patterns 230 disposed at both sides of the graphene pattern 220, and an upper substrate 300 disposed on the second substrate 200 and including sensing patterns 310.

When an object touches the sensing patterns 310, the graphene pattern 220 may be physically deformed, and thus a resistance of the graphene pattern 220 may be changed. The electrode patterns 230 may sense the change in resistance of the graphene pattern 220, and thus the sensing signal described with reference to FIGS. 1 to 3 may be generated.

In addition, the first protruding region 110a may be disposed to face the second concave region 210b, and the first concave region 110b may be disposed to face the second protruding region 210a. Thus, when the object touches the sensing patterns 310, the physical deformation of the graphene pattern 220 may be increased to easily change the resistance of the graphene pattern 220 by the touch of the object. As a result, the sensing sensitivity of the touch sensor may be improved.

FIG. 8 is a perspective view illustrating a second embodiment of a touch sensor of a sensing unit included in a tactile perception system according to some embodiments of the inventive concepts.

Referring to FIG. 8, a touch sensor according to a second embodiment may include a first substrate structure, a second substrate structure, a separation layer 600, and an upper substrate 700 having sensing patterns 710.

The first substrate structure may include a first substrate 410, first graphene patterns 422a and 422b on the first substrate 410, adhesive layers 420a and 420b between the first substrate 410 and the first graphene patterns 422a and 422b, and electrode patterns 430 on the first graphene patterns 422a and 422b.

The second substrate structure may include a second substrate and second graphene patterns 522 on the second substrate. The second substrate may include a base substrate 510, a planarization layer 512, and an insulating layer 514.

The separation layer 600 having an opening 610 may be disposed between the first substrate structure and the second substrate structure. Electrical connection between the first graphene patterns 422a and 422b and the second graphene patterns 522 through the opening 610 may be controlled or adjusted according to whether an object touches the sensing patterns 710 or not. Thus, the touch of the object to the sensing patterns 710 may be sensed to generate the sensing signal described with reference to FIGS. 1 to 6.

FIG. 9 is a perspective view illustrating a third embodiment of a touch sensor of a sensing unit included in a tactile perception system according to some embodiments of the inventive concepts.

Referring to FIG. 9, a touch sensor according to a third embodiment may include a base substrate 810, a first graphene pattern 820 disposed on one surface of the base substrate 810, electrode patterns 830 disposed at both sides of the first graphene pattern 820, a second graphene pattern 840 being in contact with the electrode patterns 830 and disposed on the first graphene pattern 820, and an upper substrate 850 disposed on another surface of the base substrate 810 and having sensing patterns 852.

A contact area between the first and second graphene patterns 820 and 840 may be adjusted according to a touch of an object to the sensing patterns 852, and thus the sensing signal described with reference to FIGS. 1 to 6 may be generated by a change in resistance between the electrode patterns 830.

FIG. 10 is a graph for explaining a sensing signal of PET measured using a tactile perception system according to some embodiments of the inventive concepts, and FIG. 11 is a graph for explaining a sensing signal of fabric measured using a tactile perception system according to some embodiments of the inventive concepts. FIG. 12 is a graph for explaining a sensing signal of patterned PDMS measured using a tactile perception system according to some embodiments of the inventive concepts.

Referring to FIGS. 10 to 12, a sensing signal and sensing information according to an object were measured and analyzed using the tactile perception system including the touch sensor according to the first embodiment described with reference to FIG. 7. In detail, non-patterned PET, no periodic fabric and patterned PDMS were prepared as objects for measuring sensing signals and sensing information. A graph (a) of FIG. 10, a graph (a) of FIG. 11 and a graph (a) of FIG. 12 are sensing signals of the non-patterned PET, the no periodic fabric and the patterned PDMS, respectively. A graph (b) of FIG. 10, a graph (b) of FIG. 11 and a graph (b) of FIG. 12 are signals obtained by frequency-converting the sensing signals of the graph (a) of FIG. 10, the graph (a) of FIG. 11 and the graph (a) of FIG. 12, respectively.

As shown in the graph (a) of FIG. 10, the graph (a) of FIG. 11 and the graph (a) of FIG. 12, the sensing signals different from each other are measured according to surface characteristics of the objects. In addition, the sensing signals have voltage values which are periodically changed. Furthermore, as shown in the graph (b) of FIG. 10, the graph (b) of FIG. 11 and the graph (b) of FIG. 12, peak values are observed in specific frequency bands of the frequency-converted sensing signals by the surface characteristics of the objects. In other words, the sensing signal of the surface characteristics of the object may be frequency-converted, the sensing information may be extracted from the frequency-converted sensing signal, and the extracted sensing information may be matched with the surface characteristics of the object. The sensing information and the surface characteristics matched with each other may be applied to the tactile perception system.

The tactile perception system and the method of building the database thereof according to the embodiments of the inventive concepts may be used in various devices and systems which sense surface characteristics of an object to extract tactile information of the object.

The tactile perception system according to some embodiments of the inventive concepts may include the storage unit storing tactile data and feature information corresponding to the tactile data, the sensing unit sensing surface characteristics of an object to generate the sensing signal, the extraction unit extracting the sensing information from the sensing signal generated by the sensing unit, and the matching unit extracting a piece of feature information, which is matched with the sensing information, from the feature information stored in the storage unit and extracting a piece of tactile data, which corresponds to the piece of feature information, from the tactile data stored in the storage unit. Thus, it is possible to provide a highly reliable tactile perception system which can sense the surface characteristics of the object to easily transfer the information to a user.

While the inventive concepts have been described with reference to exemplary embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A tactile perception system comprising:
   a memory configured to store tactile data and feature information corresponding to the tactile data;
   a sensor configured to sense surface characteristics of an object to generate a sensing signal; and
   at least one processor to implement:
   an extraction unit extracting sensing information from the sensing signal generated by the sensor; and
   a matching unit extracting a piece of feature information, which is matched with the sensing information, from the feature information stored in the memory and extracting a piece of tactile data, which corresponds to the piece of feature information, from the tactile data stored in the memory,
   wherein the sensor comprises at least one of a first touch sensor, a second touch sensor, or a third touch sensor, wherein the first touch sensor includes a first graphene pattern provided between a first substrate and a second substrate, the first substrate and the second substrate each having a protruding region and a concave region, first electrode layers disposed at both sides of the first graphene pattern, and a first upper substrate disposed on the second substrate and including first sensing patterns, wherein the protruding region of the first substrate faces the concave region of the second substrate, and the concave region of the first substrate faces the protrusion region of the second substrate, with the first graphene pattern being disposed between the first substrate and the second substrate, wherein the first graphene pattern is physically deformed when the object touches the first sensing patterns, wherein the second touch sensor includes a first substrate structure, a second substrate structure, a separator having an opening disposed between the first substrate structure and the second substrate structure, and a second upper substrate having second sensing pattern, wherein the first substrate structure includes a third substrate, a second graphene pattern having segments spaced apart from each other on the third substrate, and second electrode layers connected to each of the segments, wherein the second substrate structure includes a fourth substrate and a third graphene pattern on the fourth substrate, wherein electrical connection between the second graphene pattern and the third graphene pattern is controlled according to whether the object touches the second sensing pattern or not, wherein the third touch sensor includes a fourth graphene pattern, a fifth graphene pattern stacked adjacent to the fourth graphene pattern, and third electrode layers which are disposed next to both sides of the fourth graphene pattern, spaced apart from the fourth graphene pattern, and connected to the fifth graphene pattern, and wherein a contact area between the fourth and fifth graphene patterns changes according to a touch of the object on the third touch sensor.

2. The tactile perception system of claim 1, wherein the tactile data include information on hardness, elasticity, a shape and/or a roughness of the object.

3. The tactile perception system of claim 1, the at least one processor further implements:
a noise removal unit removing noise of the sensing signal.

4. The tactile perception system of claim 1, the at least one processor further implements:
a transfer unit transferring the piece of tactile data to a user.

5. The tactile perception system of claim 1, wherein the extraction unit frequency-converts the sensing signal and extracts the sensing information from the frequency-converted sensing signal.

6. The tactile perception system of claim 5, wherein the sensing information includes a peak value in a specific frequency band of the frequency-converted sensing signal.

7. A method of building a database of a tactile perception system, the method comprising:
generating a sensing signal by sensing surface characteristics of an object by a sensor;
extracting, by at least one processor, sensing information corresponding to the surface characteristics of the object from the sensing signal; and
matching and storing, by the at least one processor, the surface characteristics of the object and the sensing information, wherein the sensor comprises at least one of a first touch sensor, a second touch sensor, or a third touch sensor, wherein the first touch sensor includes a first graphene pattern provided between a first substrate and a second substrate, the first substrate and the second substrate each having a protruding region and a concave region, first electrode layers disposed at both sides of the first graphene pattern, and a first upper substrate disposed on the second substrate and including first sensing patterns, wherein the protruding region of the first substrate faces the concave region of the second substrate, and the concave region of the first substrate faces the protrusion region of the second substrate, with the first graphene pattern being disposed between the first substrate and the second substrate, wherein the first graphene pattern is physically deformed when the object touches the first sensing patterns, wherein the second touch sensor includes a first substrate structure, a second substrate structure, a separator having an opening disposed between the first substrate structure and the second substrate structure, and a second upper substrate having second sensing pattern, wherein the first substrate structure includes a third substrate, a second graphene pattern having segments spaced apart from each other on the third substrate, and second electrode layers connected to each of the segments, wherein the second substrate structure includes a fourth substrate and a third graphene pattern on the fourth substrate, wherein electrical connection between the second graphene pattern and the third graphene pattern is controlled according to whether the object touches the second sensing pattern or not, wherein the third touch sensor includes a fourth graphene pattern, a fifth graphene pattern stacked adjacent to the fourth graphene pattern, and third electrode layers which are disposed next to both sides of the fourth graphene pattern, spaced apart from the fourth graphene pattern, and connected to the fifth graphene pattern, and wherein a contact area between the fourth and fifth graphene patterns changes according to a touch of the object on the third touch sensor.

8. The method of claim 7, wherein the extracting of the sensing information comprises:
frequency-converting the sensing signal; and
defining a peak value in a specific frequency band of the frequency-converted sensing signal as the sensing information.

9. The method of claim 8, wherein the sensing information has a value changed according to a surface roughness of the object.

10. A tactile perception system comprising:
a sensor configured to sense surface characteristics of a target object and a comparative object to generate a target sensing signal and a comparative sensing signal, respectively;
at least one processor configured to extract target sensing information from the target sensing signal and the comparative sensing signal generated by the sensor; and a memory configured to store the target sensing information matched with tactile data of the target object, wherein the at least one processor frequency-converts the target sensing signal and the comparative sensing signal, wherein the at least one processor compares the frequency-converted target sensing signal with the frequency-converted comparative sensing signal to define at least some of frequency values and corresponding peak values, at which differences between peak values exist, as the target sensing information, and wherein the sensor comprises at least one of a first touch sensor, a second touch sensor, or a third touch sensor, wherein the first touch sensor includes a first graphene pattern provided between a first substrate and a second substrate, the first substrate and the second substrate each having a protruding region and a concave region, first electrode layers disposed at both sides of the first graphene pattern, and a first upper substrate disposed on the second substrate and including first sensing patterns, wherein the protruding region of the first substrate faces the concave region of the second substrate, and the concave region of the first substrate faces the protrusion region of the second substrate, with the first graphene pattern being disposed between the first substrate and the second substrate, wherein the first graphene pattern is physically deformed when the object touches the first sensing patterns, wherein the second touch sensor includes a first substrate structure, a second substrate structure, a separator having an opening disposed between the first substrate structure and the second substrate structure, and a second upper substrate having second sensing pattern, wherein the first substrate structure includes a third substrate, a second graphene pattern having segments spaced apart from each other on the third substrate, and second electrode layers connected to each of the segments, wherein the second substrate structure includes a fourth substrate and a third graphene pattern on the fourth substrate, wherein electrical connection between the second graphene pattern and the third graphene pattern is controlled according to whether the object touches the second sensing pattern or not, wherein the third touch sensor includes a fourth graphene pattern, a fifth graphene pattern stacked adjacent to the fourth graphene pattern, and third electrode layers which are disposed next to both sides of the fourth graphene pattern, spaced apart from the third graphene pattern, and connected to the fifth graphene pattern, and wherein a contact area between the fourth and fifth graphene patterns changes according to a touch of the object on the third touch sensor.

11. The tactile perception system of claim 10, wherein the at least one processor calculates differences between peak values of the frequency-converted target sensing signal and peak values of the frequency-converted comparative sensing signal.

12. The tactile perception system of claim 11, wherein the at least one processor aligns frequency values and corresponding peak values of the frequency-converted target sensing signal in order of magnitude of the differences.

13. The tactile perception system of claim 10, the at least one processor is further configured to:

remove noise and a bias from the target sensing signal, and frequency-converts the target sensing signal, from which the noise and the bias are removed, and extracts the target sensing information by using the frequency-converted target sensing signal.

\* \* \* \* \*